US012698923B2

(12) United States Patent 
Ashley et al.

(10) Patent No.: US 12,698,923 B2 
(45) Date of Patent: Aug. 4, 2026

(54) SYSTEMS AND METHODS FOR A WIRELESS CASCADING WATER HEATING SYSTEM

(71) Applicant: Rheem Manufacturing Company, Atlanta, GA (US)

(72) Inventors: Eric William Ashley, Trabuco Canyon, CA (US); Hendrik Brinks, Klazienaveen (NL); Gerrit Dekker, Klijndijk (NL)

(73) Assignee: Rheem Manufacturing Company, Atlanta, GA (US)

( * ) Notice: Subject to any disclaimer, the term of this patent is extended or adjusted under 35 U.S.C. 154(b) by 423 days.

(21) Appl. No.: 18/208,043

(22) Filed: Jun. 9, 2023

(65) Prior Publication Data

US 2024/0410623 A1     Dec. 12, 2024

(51) Int. Cl.
    *F24H 15/464*     (2022.01)
    *G05B 19/4155*     (2006.01)

(52) U.S. Cl.
    CPC ....... *F24H 15/464* (2022.01); *G05B 19/4155* (2013.01); *G05B 2219/50333* (2013.01)

(58) Field of Classification Search
    CPC ...... F24H 15/464; F24H 15/443; F24H 15/45; F24H 15/457; F24H 15/493; G05B 19/4155; G05B 2219/50333
    See application file for complete search history.

(56) References Cited

U.S. PATENT DOCUMENTS

| | | | |
|---|---|---|---|
| 8,485,178 B2 * | 7/2013 | Diaz | F24H 15/365 |
| | | | 126/609 |
| 10,795,665 B2 | 10/2020 | Imi et al. | |
| 2004/0176858 A1 | 9/2004 | Kuwahara et al. | |
| 2006/0173653 A1 * | 8/2006 | Chian | F24H 15/104 |
| | | | 702/182 |

(Continued)

FOREIGN PATENT DOCUMENTS

JP     2021116977 A   *   9/2021    ............... H04Q 9/00

OTHER PUBLICATIONS

International Search Report and Written Opinion for PCT Application No. PCT/US2024/032405 mailed Sep. 11, 2024, 14 pages.

*Primary Examiner* — Kidest Worku
(74) *Attorney, Agent, or Firm* — Eversheds Sutherland (US) LLP

(57) ABSTRACT

Systems and methods are provided for wireless cascading water heater systems. The wireless cascading water heater system may include several water heaters that may include one or more of a tankless water heater, a boiler, or a combination boiler, for example. One or more of the water heaters may communicate with a remote controller and/or a user device. The water heaters may further be in wireless communication with one another. One water heater may be designated the lead water heater and a second water heater may be designated the backup water heater. The lead water heater may oversee operation of the follower water heaters in response to a hot water demand. A hierarchical order may be determined for selecting which water heaters will respond (Continued)

to hot water demand and in what order. The hierarchical order may be based on the age of the water heater, burn time for the water heater for optimization and efficiency purposes.

20 Claims, 6 Drawing Sheets

(56) References Cited

U.S. PATENT DOCUMENTS

| | | | |
|---|---|---|---|
| 2010/0004790 A1* | 1/2010 | Harbin, III | F24H 15/168 |
| | | | 709/219 |
| 2012/0138149 A1* | 6/2012 | Hatada | F24H 9/2035 |
| | | | 122/367.1 |
| 2012/0191256 A1* | 7/2012 | Deivasigamani | G05D 23/1932 |
| | | | 700/276 |
| 2019/0170398 A1 | 6/2019 | Chaudhry et al. | |

* cited by examiner

100

| Unit | Use | Hierarchy |
|------|-----|-----------|
| 1 | 12 | 5 |
| 2 | 11 | 4 |
| 3 | 8 | 1 |
| 4 | 13 | 7 |
| 5 | 10 | 3 |
| 6 | 12 | 6 |
| 7 | 9 | 2 |
| 8 | 15 | 9 |
| 9 | 14 | 8 |

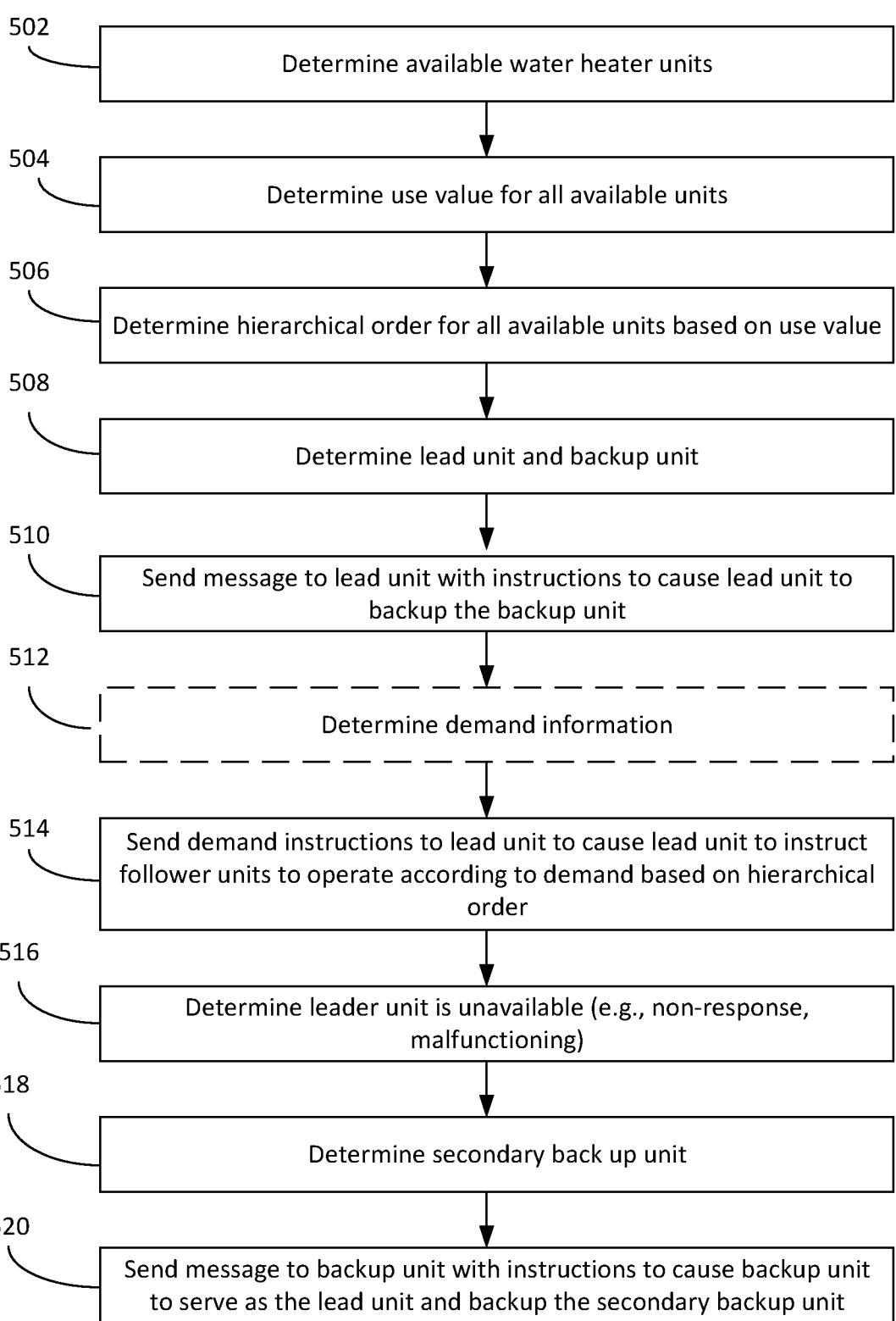

502 Determine available water heater units

504 Determine use value for all available units

506 Determine hierarchical order for all available units based on use value

508 Determine lead unit and backup unit

510 Send message to lead unit with instructions to cause lead unit to backup the backup unit 512 Determine demand information 514 Send demand instructions to lead unit to cause lead unit to instruct follower units to operate according to demand based on hierarchical order 516 Determine leader unit is unavailable (e.g., non-response, malfunctioning)

518 Determine secondary back up unit

520 Send message to backup unit with instructions to cause backup unit to serve as the lead unit and backup the secondary backup unit

FIG. 5

SYSTEMS AND METHODS FOR A WIRELESS CASCADING WATER HEATING SYSTEM

TECHNICAL FIELD

The present disclosure is generally in the field of water heaters. For example, systems and methods are provided herein for cascading water heaters in a wireless communication.

BACKGROUND

Water heaters such as tankless water heaters, boilers, and combination boilers are commonly used for generating and regulating hot water use for residential and commercial settings. For example, tankless water heaters are commonly used to heat water in a residential setting for bathing and/or for cooking. Further, boilers and combination boilers are also used for similar purposes. Such water heaters are also known to be used for commercial purposes, for example in retail, office spaces, and even in manufacturing.

In both residential and commercial settings, demand for warm or hot water can be high, such as in a multi-unit residential building. For example, in large metropolitan cities, hundreds of residential units of a single building may demand heated water at similar times (e.g., at 8:00 am in the morning). Multiple water heaters may be installed in such buildings and may be tasked with heating the water to appropriate temperatures. The demand may be even higher during the winter season when the exterior temperature can reach temperatures below freezing. Similar demands may be present in commercial facilities and manufacturing plants requiring large volumes of heated water.

In scenarios where hot water demand is high, a residential or commercial structure may include multiple hot water units that are in communication with one another. For example, as shown in FIG. 1, wired cascading water heater system 100 is illustrated with each hot water heater unit in wired communication with another hot water unit forming a daisy chain, such that the hot water units are connected in series. In this manner, the hot water units may work together to satisfy the hot water demand, and may be arranged in order such that units earlier in the chain will be tasked with providing hot water before the units that follow. In this manner, units with a higher run times or burn times could be placed at the end of the daisy chain to extend the life of such units.

The cascading water heater system illustrated in FIG. 1 is vulnerable to failure, however, as the wired daisy chain could be cut and fail, leaving certain water heater units cut off. Further, a lead unit overseeing operation of the other units could fail, leaving the remaining functioning units useless with no instruction or oversight. Also, the wiring between water heater units limits the distance between each unit. This is especially true given the high cost of such wiring, which is often proprietary wiring.

Accordingly, there is a need for improved methods and systems for effectively implementing a cascading water heater system in a more reliable and robust manner.

BRIEF DESCRIPTION OF THE DRAWINGS

FIG. 5 is a process flow diagram for determining lead and back up water heaters and causing follower units to satisfy hot water demand, in accordance with one or more example embodiments of the disclosure.

DETAILED DESCRIPTION

Wireless cascading water heating systems have been developed for efficiently and reliably responding to hot water needs in both residential and commercial settings. For example, the water heating system may include several water heater units that each may be in wireless communication with a lead water heater unit and/or each other via wireless communication (e.g., radio frequency (RF) communication). The lead water heater may further communicate with a remote controller (e.g., server). A backup water heater unit may be designated and the lead water heater may send backup information to the backup water heater. The lead water heater may receive hot water demand information and may select water heaters to satisfy the demand and wirelessly instruct certain selected water heaters to operate to satisfy the demand.

Figure 1:
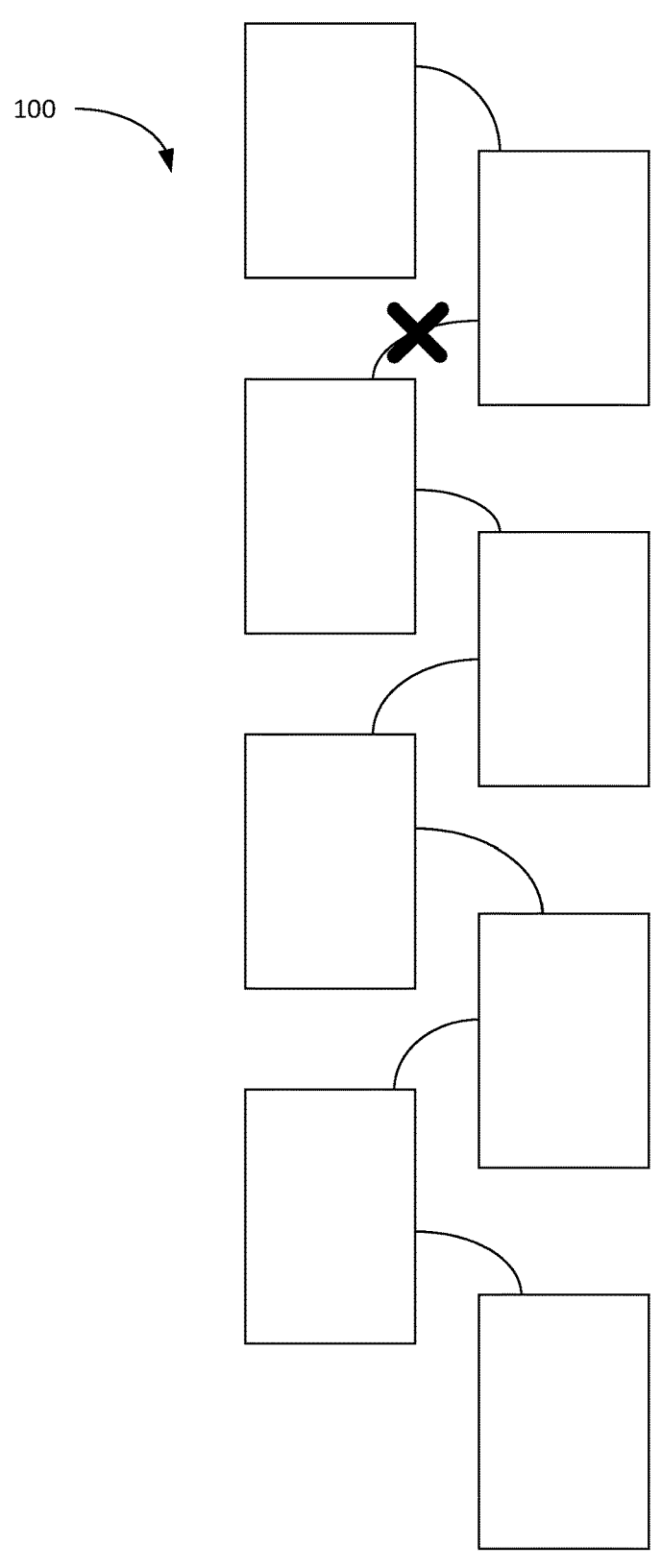
FIG. 1 is a schematic illustration of a wired cascading water heater system.
Figure 2:
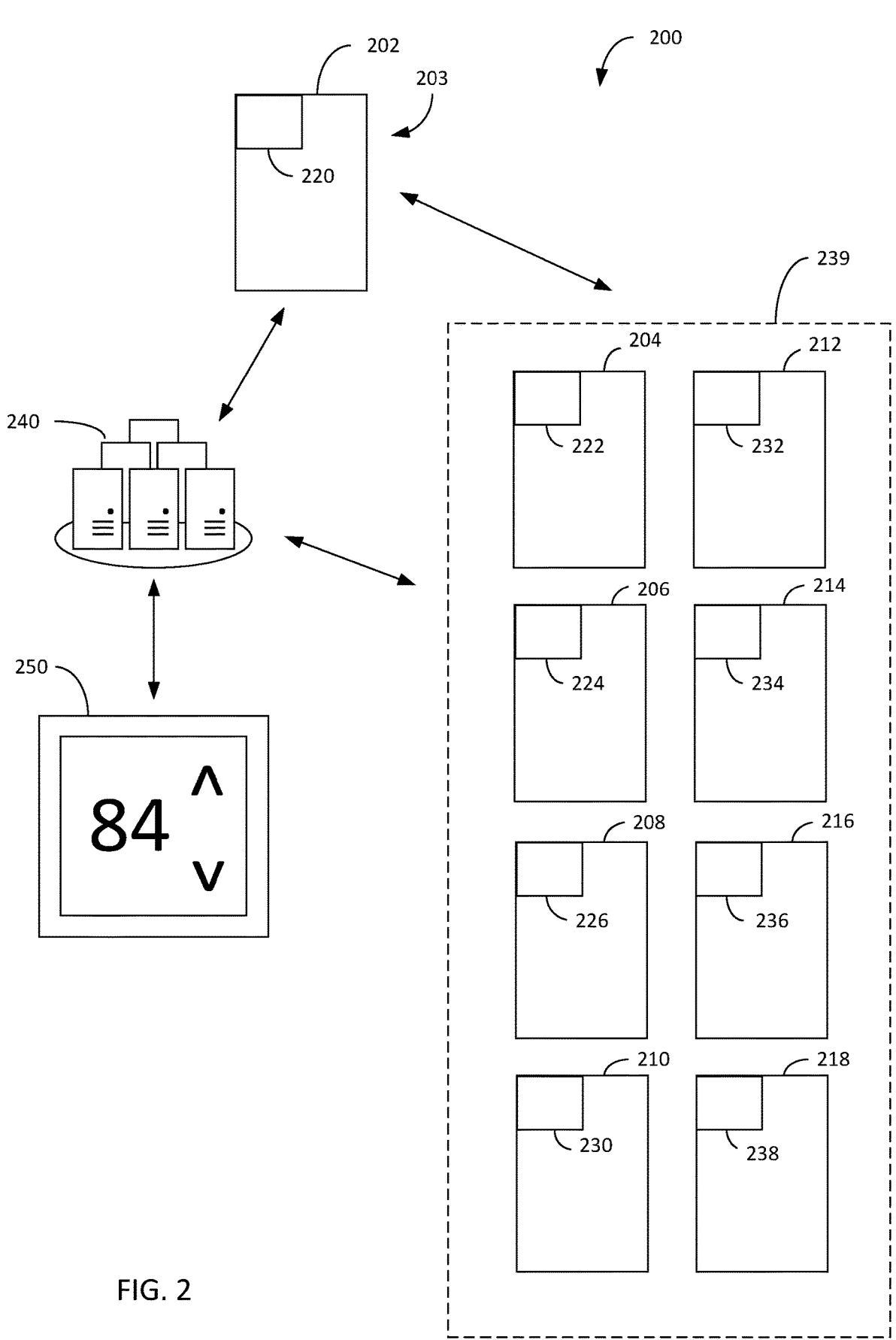
FIG. 2 is a schematic illustration a wireless cascading water heater system including a remote controller and a user device, in accordance with one or more example embodiments of the disclosure.

Referring now to FIG. 2, a schematic illustration of a wireless cascading water heater system, a remote controller, and a user device is depicted. Specifically, wireless cascading water heater system 200 may include water heater 202 and water heaters 204-218. Water heater 202 and/or water heaters 204-218 may be any combination of tankless water heaters, boilers, combination boilers, and/or any other water heater system designed to heat a volume of water and/or other liquid (e.g., heat pump water heater).

Water heater 202 and/or any of water heaters 204-218 may each include a controller and a heat exchanger designed to heat water or any other fluid. Water heater 202 may include controller 220 and water heaters 204-218 may include controllers 222-238, respectively. Each of controller 220 and controllers 222-238 may be any computing device with a processor and optionally may include one or more displays (e.g., touch screen display), one or more user interfaces (e.g., buttons), and/or one or more speakers and/or microphones. Controller 220 and controllers 222-238 may control the operation and function of a respective water heater and may further oversee communication between the respective water heater and other water heaters, servers, remote controllers, user devices, and the like.

Controller 220 and controllers 222-238 may communicate wirelessly with one another. For example, controller 220 and controllers 222-238 may communicate via RF technology or via any other wireless technology or network (e.g., Wi-Fi, Wi-Fi Direct, cellular network, Bluetooth, Bluetooth Low Energy (BLE) network, near field communication protocol, or the like). Controller 220 and/or controllers 222-238 may also be in communication with remote controller 240 and/or user device 250.

Remote controller 240 may be any computing device (e.g., one or more servers) with one or more processors and may be capable of communicating, via a wired or wireless connection, with at least on one of controller 220 and controllers 222-238. For example, controller 220 and controllers 222-238 may communicate wirelessly with remote controller 240 via any suitable wireless network (e.g., Wi-Fi, Wi-Fi Direct, cellular network, Bluetooth, Bluetooth Low Energy (BLE) network, near field communication protocol, or the like).

Remote controller 240 may be positioned in the same location as controller 220 and controllers 222-238, or may be remote with respect to controller 220 and controllers 222-238. Remote controller 240 may further be in communication with user device 250. User device 250 may be any computing device with one or more processors and may be capable of communicating, via a wired or wireless connection, with remote controller 240. For example, user device 250 may be a tablet device, smart phone, or other touch screen device for receiving user input (e.g., touch screen or buttons). In one example, user device 250 may communicate a desired hot water temperature or other operational setting of the wireless cascading hot water system to remote controller 240.

Remote controller 240 may oversee and control operation of controller 220 and controllers 222-238. For example, remote controller 240 may determine how many and which water heaters of water heaters 202 and 204-218 should be used to respond to demand for hot water. Remote controller 240 may select a water heater unit to serve as a leader and other water heater units to serve as followers. Alternatively, the lead water heater unit may make this determination. Remote controller 240 may communicate instructions and commands to the lead unit and the lead unit may wirelessly communicate the operational instructions and other information to the followers.

As shown in FIG. 2, water heater 202 may be selected as lead unit 203 and water heaters 204-218 may be selected as follower units 239. For example, remote controller 240 may select lead unit 203 and follower units 239. Lead unit 203 may be tasked with communicating with remote controller 240 and wirelessly communicating instructions and other messages to follower units 239 based on instructions and information provided from remote controller 240. Alternatively, or additionally, remote controller may also communicate with follower units 239.

In one example, the leader will enable, disable, and modulate followers to meet the hot water demand at the desired temperature in an efficient manner. The leader may search for followers by sending a communication to the follower. For example, a message may be sent wirelessly by the leader to the followers one or more times every minute. The follower may acknowledge the request and once an acknowledgement is received by the leader, the communication messages may be less frequent.

If a follower is non-responsive, the leader may assume that the follower is unavailable, and thus begin communicating with the next follower until communication is restored. In one example, at least two types of messages may be shared between the lead unit and the follower units, information messages and demand messages. It is understood, however, that any other type of information may be shared between the leader unit, the follower units, and/or the remote controller.

Remote controller 240 and/or lead unit 203 may also create a hierarchical order for all water heater units including lead unit 203 and follower units 239. The hierarchical order may be used to determine which unit should be commanded to respond to a demand for hot water use by supplying hot water. To balance use among all water heater units in the wireless cascading water heater system, thereby extending the life of units in the system and/or the system itself, the hierarchical order may be based on a unit's age, a unit's run time, a unit's burn time if the unit includes a gas burner, and the like.

Information messages may include information regarding operational settings, information regarding the status and/or operation of a water unit, instructions regarding operational or performance settings, or the like. Demand messages may include information about a hot water demand and may provide the necessary information to the follower unit to cause the follower unit to heat a volume of water to a desired temperature necessary to satisfy the hot water demand either alone or together with other follower units. For example, demand messages may cause one or more follow unit to adjust a firing rate of the water heater unit to satisfy the hot water demand.

Information messages may be sent from the leader to the follower unit on a regular basis. For example, the frequency at which the leader unit sends information messages may depend on the state of the system. In one example, when a water unit is in use, information messages may be sent less than 1% of the total time on an hourly basis. Demand messages may be sent based on the current or anticipated demand, regardless of the bandwidth limit (e.g., 1%) for information messages).

To reduce the chance of interference, once the 1% threshold is achieved, the leader unit may temporarily decrease the number of information messages. It is understood that 1% is exemplary and any other threshold value may be used. To further reduce the chance of interference, the water heaters in the wireless cascading water heater system may operate on frequencies not commonly used by Wi-Fi, mobile phones, or other common wireless devices.

The follower unit may similarly send messages to the leader unit. For example, if a follower unit is responding to a local hot water demand, the follower unit may send a message to the leader unit informing the leader unit that it currently in use for local hot water demand. Based on this information, the leader unit may enable the next follower in the hierarchical order for hot water demand.

Each follower unit may inform the leader unit of its operational status. For example, if the unit is malfunctioning or otherwise needs repair or maintenance, such follower unit may share this information with the leader unit. Additionally or alternatively, such information may be shared with remote controller 240. In addition to sharing its status wirelessly, each water heater unit may include a display on which the status for each water heater unit may be displayed.

While nine water heater units are illustrated in FIG. 2, it is understood that a fewer or greater number water heaters may be used in wireless cascading water heater system 200. It is understood that water heater 202 and/or water heaters 204-218 may be in the same building and/or location or may be positioned in more than one building. It is further understood that remote controller and/or user device 250 may be positioned in the same building as water heater 202 and/or water heaters 204-218 or may be positioned in different buildings.

Figure 3:
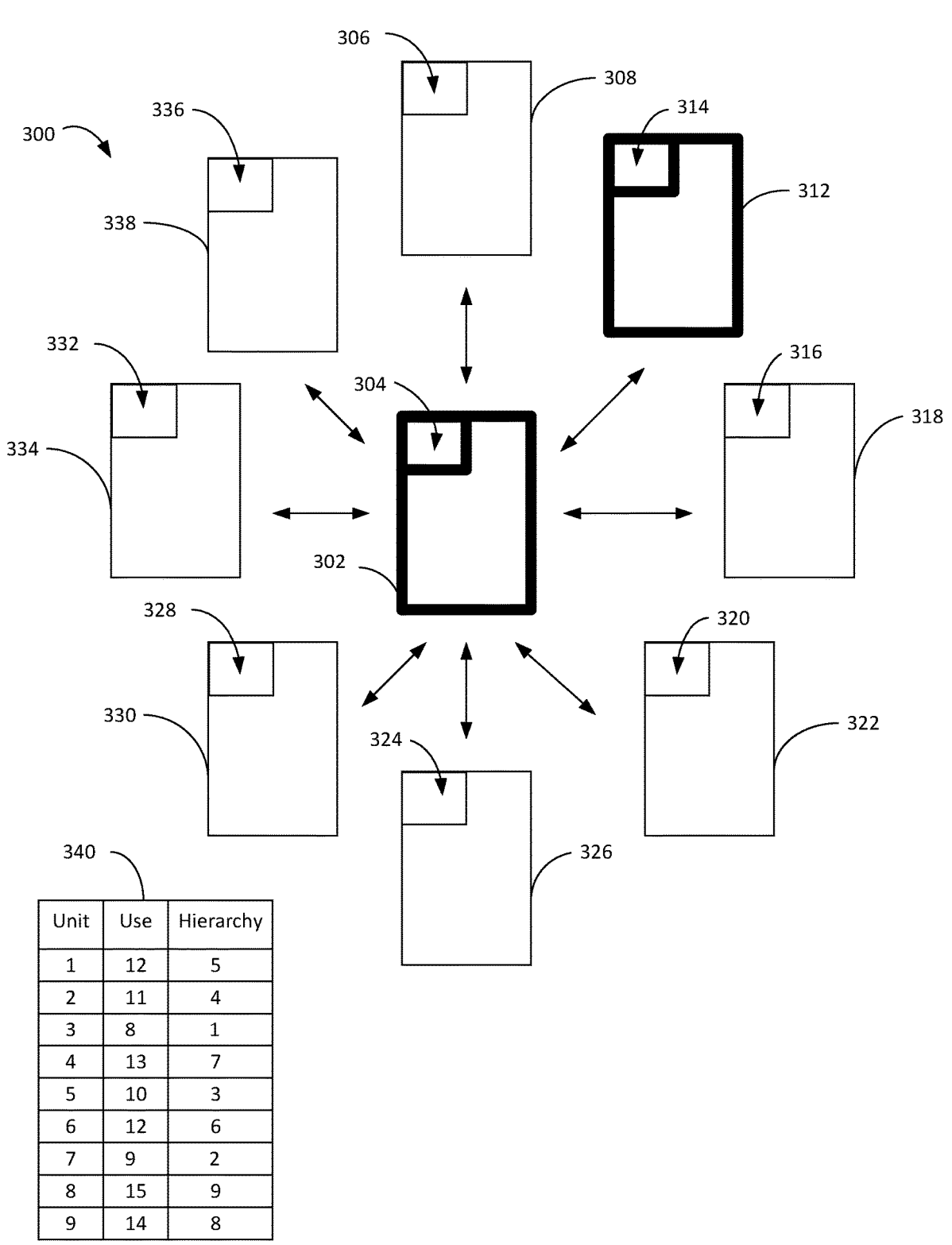
FIG. 3 is a schematic illustration of a hierarchical cascading wireless water heating system, in accordance with one or more example embodiments of the disclosure.

Referring now to FIG. 3, a schematic illustration of water heaters 300 of a wireless cascading water heater system are illustrated. Specifically, the water heaters of the wireless cascading water heater system may include water heaters 302, 308, 312, 318, 322, 326, 330, 334, and/or 338, which each may be the same as or similar to water heaters 202-218 of FIG. 2. It is understood that a greater or fewer number of water heaters may be included in the wireless cascading water heater system.

Water heaters 302, 308, 312, 318, 322, 326, 330, 334, and 338 may include controllers 304, 306, 314, 316, 320, 324, 328, 332 and 336, respectively, which may control the function and operation of each water heater and/or may facilitate wireless communication between one or more water heaters, remote controllers, and/or user devices. As shown in FIG. 3, water heater 302 may be selected as the lead unit and/or water heater 312 may be selected as the follower unit.

In one example, a remote controller may select water heater 302 as the lead unit and/or water heater 312 as the follower unit. Alternatively, the user device, water heater 302 and/or any other water heater of the wireless cascading water heater system may make this determination. The lead unit may be tasked with wirelessly communicating with, controlling, and otherwise overseeing operation of and cooperating between the water heaters of the wireless cascading water heater system.

As shown in FIG. 3, each of water heaters 308, 312, 318, 322, 326, 330, 334, and 338 may communicate directly with the lead water heater (e.g., water heater 302). For example, the follower water heaters may share the operational status and other performance information with the lead water heater. The lead water heater (e.g., water heater 302) may be charged with backing up some or all of its operational and historical information onto backup water heater 312. For example, water heater 302 may save operational information, performance information, commands and other information from the remote controller, and may share this information with the backup water heater to be saved locally on the backup water heater.

The remote controller may determine hierarchical order 340, which may set forth the order in which water heater units of the wireless cascading water heater units should be charged with supplying hot water to satisfy the hot water demand. The purpose of the hierarchal order may be to balance use among all water heater units in the wireless cascading water heater system, thereby extending the life of the entire system. It is understood that the leader unit and/or user device may alternatively or additionally be used to determine hierarchical order 340.

The hierarchical order 340 may be based on a unit's age, a unit's run time, a unit's burn time if the unit includes a gas burner, a total volume of water heater, and the like. The units remaining life of use condition may be estimated and a use value corresponding to the remaining life or use condition may be determine and may populate the use column of hierarchical order 340. The use value may be used to determine the hierarchy value in the hierarchy column.

In the exemplary wireless cascading water heater system illustrated in FIG. 3, water heater 308 may be unit 1, water heater 312 may be unit 2, water heater 318 may be unit 3, water heater 322 may be unit 4, water heater 326 may be unit 5, water heater 330 may be unit 6, water heater 334 may be unit 7, water heater 338 may be unit 8, and water heater 302 may be unit 9. In this example, water heater 318 may be first tasked with responding to hot water demand, followed by water heater 334, then water heater 326.

Figure 4:
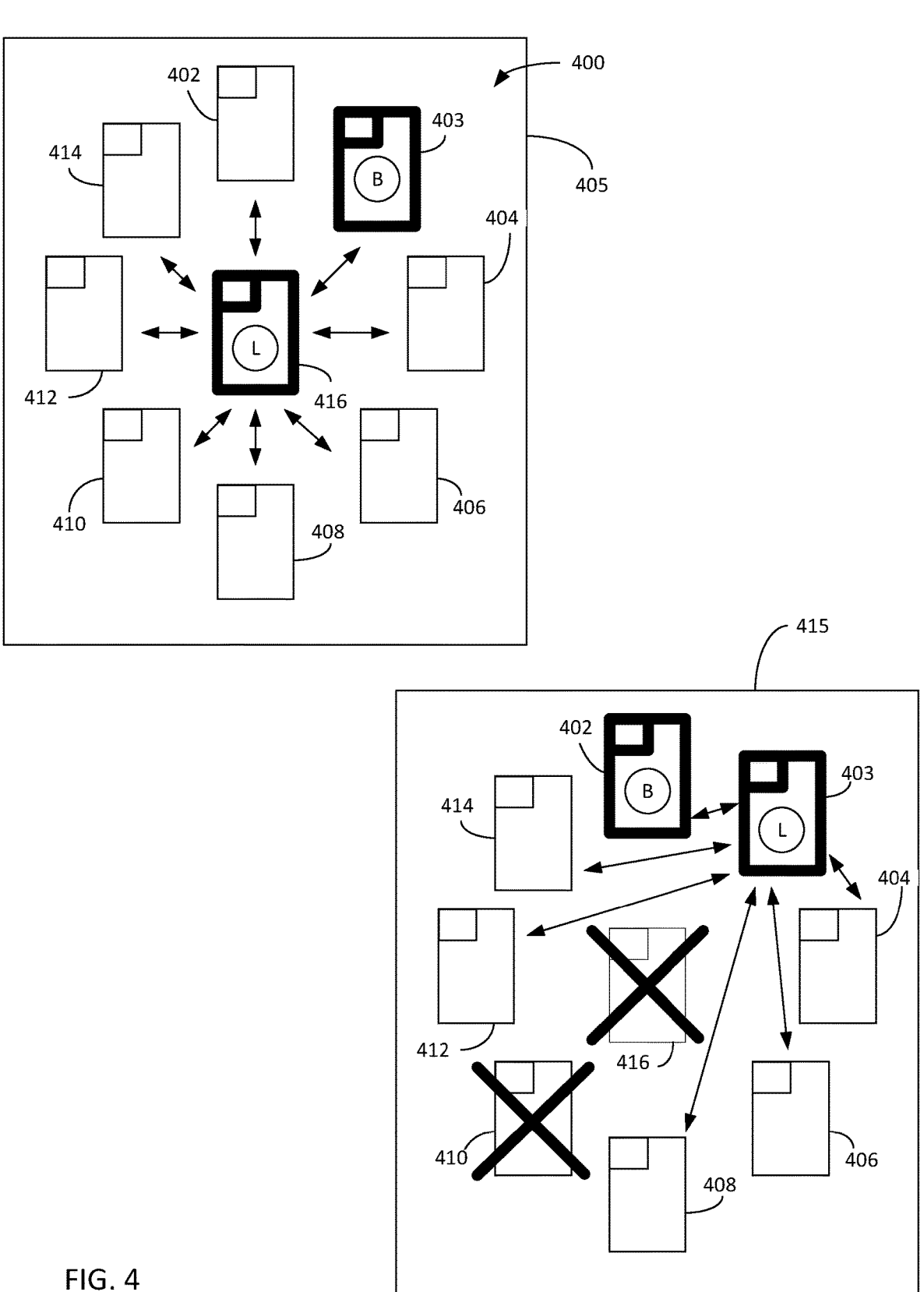
FIG. 4 is a schematic illustration of changing the lead water heater and the backup water, heater in accordance with one or more example embodiments of the disclosure.

Referring now to FIG. 4, schematic illustrations of water heaters 400 of a wireless cascading water heater system are illustrated. Specifically, water heaters 400 of the wireless cascading water heater system may include water heaters 402, 403, 404, 406, 408, 410, 412, 414, and 415, which each may be the same as or similar to water heaters 202-218 of FIG. 2. It is understood that a greater or fewer number of water heaters may be included in the wireless cascading water heater system.

As shown in FIG. 4, water heaters 400 may be organized in arrangement 405, in which water heater 416 may be selected as the lead unit and water heater 403 may be selected as a backup unit, meaning a backup to the lead unit. As the lead unit, water heater 416 may be charged with periodically (e.g., every 30 seconds, every minute, every five minutes, etc.) sending backup information to the backup unit 403. For example, water heater 302 may locally save operational information, performance information, commands and other information received from the other water heaters and/or the remote controller, and may share this information with the backup water heater.

If the lead water heater experiences a malfunction, loses power, and/or is no longer able to function as a water heater and/or as the lead water heater, the water heater designated as the backup water heater (e.g., water heater 403 in arrangement 405) may then serve as the leave water heater until the originally designated lead water heater (e.g., water heater 416) is back online and capable of reprising the role of the lead water heater).

Arrangement 415 illustrates the scenario where the original lead water heater, water heater 416, is unable to function as the lead water heater and the role of lead water heater has been shifted to water heater 403, the original backup water heater. In arrangement 415, water heater 402 is selected as the backup water heater, and water heater 403, as the lead water heater, such that water heater 403 is tasked with sending backup information to backup water heater 402. It is understood that if water heater 403 is subsequently determined to be unavailable (e.g., non-responsive, malfunctioning, etc.), then yet another water heater 402 will become the lead water heater. In this manner, the wireless cascading water heater system may dynamically and in real time or near real time switch the lead unit and backup unit responsive to the availability of various water units in the cascading water heater system.

The remote controller may determine hierarchical order for lead and back up water units. For example, the remote controller may randomly select water heaters to serve in this capacity or may make this decision based on other factors such as physical location of the water heaters, age of the water heater, computing capacity, or any other relevant factor. Similarly if a follower unit (e.g., water heater 410) is determined to be unavailable, then the hierarchical order according to the use value may be referenced to determine the water heater unit next in line behind the unavailable follower unit and such next water heater may be charged with satisfying the hot water demand.

Referring now to FIG. 5, process flow 500 for adjusting operation of a wireless cascading water heater system is depicted. The operations and/or tasks set forth in process flow 500 may be performed by a remote controller, user device and/or a water heater controller. For example, the remote controller may be the same or similar to remote controller 240 of FIG. 2.

While example embodiments of the disclosure may be described in the context of a remote controller, it should be appreciated that the disclosure is more broadly applicable to various types of computing devices such as a user device and/or a water heater controller and/or any combination thereof. Some or all of the blocks of the process flows in this disclosure may be performed in a distributed manner across any number of devices. The operations of process flow 500 may be optional and may be performed in a different order.

At block 502, computer-executable instructions stored on a memory of a device, such as a remote controller, may be executed to determine available water heater units. The remote controller may directly contact all units and request confirmation or may contact a single unit and instruct the single unit to find available units. At block 504, computer-executable instructions stored on a memory of a device, such as a remote controller, may be executed to determine a use value for all available units. The use value may correspond to an estimated remaining life or condition to the water heater (e.g., based on age, burn life, etc.).

At block 506, computer-executable instructions stored on a memory of a device, such as a remote controller, may be executed to determine a hierarchical order for all available units, which may be based on the use value. At block 508, computer-executable instructions stored on a memory of a device, such as a remote controller, may be executed to determine a lead unit and a backup unit of the available units.

At block 510, computer-executable instructions stored on a memory of a device, such as a remote controller, may be executed to send a message to the lead unit to cause the lead unit to back up the backup unit (e.g., to send backup information to the backup unit). At optional block 512, computer-executable instructions stored on a memory of a device, such as a remote controller, may be executed to determine demand information indicative of a demand for hot water. Alternatively, one or more water heater units may make this determination.

At block 514, computer-executable instructions stored on a memory of a device, such as a remote controller, may be executed to send demand instructions to the lead unit to cause the lead unit to instruct follower units to operate according to hot water demand. The operational instructions may be based on the hot water demand and the hierarchical order. At block 516, computer-executable instructions stored on a memory of a device, such as a remote controller, may be executed to determine the lead unit is unavailable (e.g., is non-responsive, is malfunctioning, etc.).

At block 518, computer-executable instructions stored on a memory of a device, such as a remote controller, may be executed to determine a secondary backup unit. It is understood that this step may be performed at any time (e.g., at the same time the original lead unit and back up unit are determined). At block 520, computer-executable instructions stored on a memory of a device, such as a remote controller, may be executed to send a message to the original backup unit with instructions to serve as the lead unit and cause the original backup unit to backup the secondary backup unit.

Figure 6:
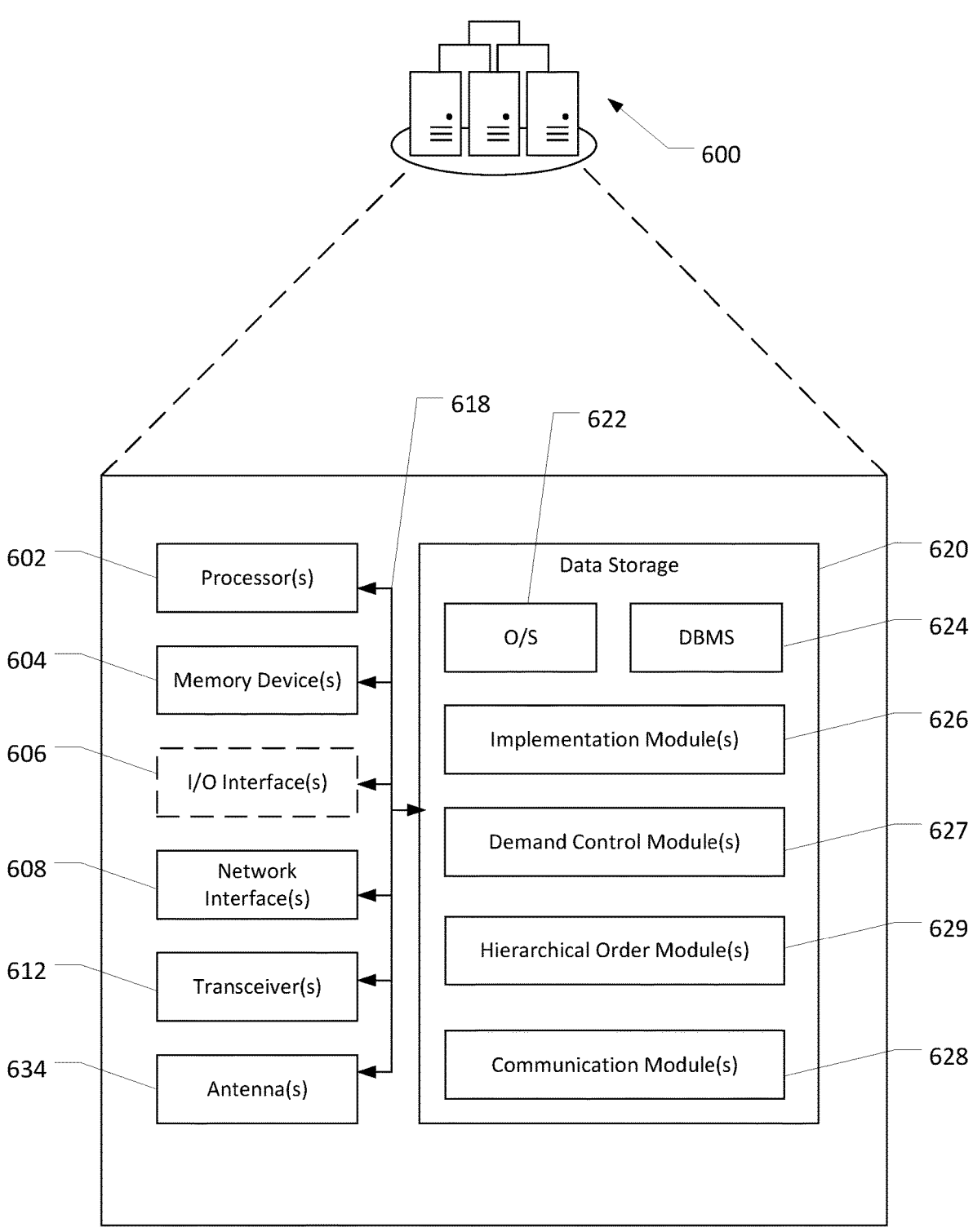
FIG. 6 is a schematic block diagram of a remote controller in accordance with one or more example embodiments of the disclosure.

FIG. 6 is a schematic block diagram of an illustrative remote controller 600, which may be in communication with one or more water heaters and/or a user device of a wireless cascading water heater system, is illustrated. Remote controller 600 may be the same or similar to remote controller 240 of FIG. 2 or otherwise one or more of the remote controllers of FIGS. 2-5. It is understood that a remote controller may alone or together with one or more water heaters and/or user devices perform one or more of the operations of remote controller 600.

Remote controller 600 may be designed to communicate with one or more servers, water heaters, user devices, other systems, or the like. Remote controller 600 may be designed to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks.

In an illustrative configuration, remote controller 600 may include one or more processors 602, one or more memory devices 604 (also referred to herein as memory 604), one or more input/output (I/O) interface(s) 606, one or more network interface(s) 608, one or more transceiver(s) 612, one or more antenna(s) 634, and data storage 620. The remote controller 600 may further include one or more bus(es) 618 that functionally couple various components of the remote controller 600.

The bus(es) 618 may include at least one of a system bus, a memory bus, an address bus, or a message bus, and may permit exchange of information (e.g., data (including computer-executable code), signaling, etc.) between various components of the remote controller 600. The bus(es) 618 may include, without limitation, a memory bus or a memory controller, a peripheral bus, an accelerated graphics port, and so forth. The bus(es) 618 may be associated with any suitable bus architecture including.

The memory 604 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth.

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein. The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

The data storage 620 may store one or more operating systems (O/S) 622; one or more optional database management systems (DBMS) 624; and one or more program module(s), applications, engines, computer-executable code, scripts, or the like such as, for example, one or more implementation modules 626, demand control modules 627, hierarchical order modules 629, and one or more communication modules 628. Some or all of these modules may be sub-modules. Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

Referring now to other illustrative components depicted as being stored in the data storage 620, the O/S 622 may be loaded from the data storage 620 into the memory 604 and may provide an interface between other application software executing on the remote controller 600 and hardware resources of the remote controller 600. More specifically, the O/S 622 may include a set of computer-executable instructions for managing hardware resources of the remote controller 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The optional DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

The optional I/O interface(s) 606 may facilitate the receipt of input information by the remote controller 600 from one or more I/O devices as well as the output of information from the remote controller 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; and so forth. Any of these components may be integrated into the remote controller 600 or may be separate.

The remote controller 600 may further include one or more network interface(s) 608 via which the remote controller 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received. Antenna(s) 634 may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth.

The transceiver(s) 612 may include any suitable radio component(s) for, in cooperation with the antenna(s) 634, transmitting or receiving radio frequency (RF) signals in the bandwidth and/or channels corresponding to the communications protocols utilized by the remote controller 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote controller 600. The transceiver(s) 612 may further include a low noise amplifier (LNA), additional signal amplifiers, an analog-to-digital (A/D) converter, one or more buffers, a digital baseband, or the like.

Referring now to functionality supported by the various program module(s) depicted in FIG. 6, the implementation module(s) 626 may include computer-executable instructions, code, or the like that responsive to execution by one or more of the processor(s) 602 may perform functions including, but not limited to, overseeing coordination and interaction between one or more modules and computer executable instructions in data storage 620, determining user actions, determining actions associated with user interactions, determining actions associated with user input, initiating commands locally or at remote devices, and the like.

The demand control module(s) 627 may include computer-executable instructions, code, or the like that responsive to execution by one or more of the processor(s) 602 may perform functions including, but not limited to, overseeing, monitoring, and/or determining hot water demand (e.g., for one or more residential or commercial use).

The communication module(s) 628 may include computer-executable instructions, code, or the like that responsive to execution by one or more of the processor(s) 602 may perform functions including, but not limited to, communicating with one or more devices, for example, via wired or wireless communication, communicating with mobile devices, communicating with user devices, communicating with water heaters, communicating with servers (e.g., remote servers), communicating with remote datastores and/ or databases, sending or receiving notifications or commands/directives, communicating with cache memory data, communicating with user devices, and the like.

The hierarchical order module(s) 629 may include computer-executable instructions, code, or the like that responsive to execution by one or more of the processor(s) 602 may perform functions including, but not limited to, determining a hierarchical order for responding to satisfying a demand for hot water use (e.g., based on a use value of the water heaters) and/or determining a hierarchical order for lead and back up units.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components, including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a CRSM that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

We claim:

1. A method for controlling a wireless water heating system comprising:

determining, by a remote controller, a first water heater, a second water heater, and a third water heater, the first water heater comprising a first controller and a first heat exchanger adapted to heat a first supply of water, the second water heater comprising a second controller and a second heat exchanger adapted to heat a second supply of water, and the third water heater comprising a third controller and a third heat exchanger adapted to heat a third supply of water, the first controller in wireless communication with the second controller and the third controller;

determining a first use value corresponding to the first water heater, a second use value corresponding to the second water heater, and a third use value corresponding to the third water heater;

determining, by the remote controller, a hierarchical order based on the first use value, the second use value, and the third use value;

determining, by the remote controller, the first water heater is a lead water heater and the second water heater is a backup water heater;

sending, by the remote controller, during operation of the first water heater as the lead water heater, first instructions to the first water heater to cause the first water heater to wirelessly send backup information to the second water heater;

determining demand information indicative of demand for hot water use;

selecting, by the remote controller, the third water heater based on the hierarchical order; and sending, by the remote controller, second instructions to the first water heater to cause the first water heater to wirelessly send first operational instructions to the third water heater, the first operational instructions based on the demand information.

2. The method of claim 1, wherein each of the first water heater, the second water heater, and the third water heater is one of a tankless water heater, a boiler, or a combination boiler.

3. The method of claim 1, wherein the first controller is in wireless communication with the remote controller.

4. The method of claim 1, wherein the first controller is in wireless communication with the second controller and the third controller via radio frequency (RF) communication.

5. The method of claim 1, further comprising:

determining the first water heater is unavailable;

determining, based on the first water heater being unavailable, to change the lead water heater to the second water heater; and determining, based on the first water heater being unavailable, to change the backup water heater to the third water heater.

6. The method of claim 5, further comprising:

sending third instructions to the second water heater to send backup information to the third water heater.

7. The method of claim 1, further comprising:

determining the third water heater is unavailable; and determining, after determining the third water heater is unavailable, that the second water heater comes after the third water heater in the hierarchical order.

8. The method of claim 7, further comprising:

sending third instructions to the first water heater to cause the first water heater to wirelessly send second operational instructions to the second water heater, the second operational instructions based on the demand information.

9. The method of claim 7, wherein the third water heater is non-responsive or malfunctioning.

10. The method of claim 1, wherein the first use value, the second use value, and the third use value are indicative of at least one of run time information or burn information for each of the first water heater, second water heater, and third water heater.

11. A wireless water heating system comprising:

a first water heater comprising a first controller and a first heat exchanger;

a second water heater comprising a second controller and a second heat exchanger;

a third water heater comprising a third controller and a third heat exchanger;

a remote controller comprising memory configured to store computer-executable instructions, and at least one computer processor configured to access memory and execute the computer-executable instructions to:

determine a first use value corresponding to the first water heater, a second use value corresponding to the second water heater, and a third use value corresponding to the third water heater;

determine, by the remote controller, a hierarchical order based on the first use value, the second use value, and the third use value;

determine, by the remote controller, the first water heater is a lead water heater and the second water heater is a backup water heater;

send, by the remote controller, during operation of the first water heater as the lead water heater, first instructions to the first water heater to cause the first water heater to wirelessly send backup information to the second water heater;

determine demand information indicative of demand for hot water use;

select, by the remote controller, the third water heater based on the hierarchical order; and send, by the remote controller, second instructions to the first water heater to cause the first water heater to wirelessly send first operational instructions to the third water heater, the first operational instructions based on the demand information.

12. The wireless water heating system of claim 11, wherein each of the first water heater, the second water heater, and the third water heater is one of a tankless water heater, a boiler, or a combination boiler.

13. The wireless water heating system of claim 11, wherein the first controller is in wireless communication with the remote controller.

14. The wireless water heating system of claim 11, wherein the first controller is in wireless communication with the second controller and the third controller via radio frequency (RF) communication.

15. The wireless water heating system of claim 11, wherein the at least one computer processor is further configured to access memory and execute the computer-executable instructions to:

determine the first water heater is unavailable;

determine, based on the first water heater being unavailable, to change the lead water heater to the second water heater; and determine, based on the first water heater being unavailable, to change the backup water heater to the third water heater.

16. The wireless water heating system of claim 15, wherein the at least one computer processor is further configured to access memory and execute the computer-executable instructions to:

send third instructions to the second water heater to cause the second water heater to send backup information to the third water heater.

17. The wireless water heating system of claim 11, wherein the at least one computer processor is further configured to access memory and execute the computer-executable instructions to:

determine the third water heater is unavailable; and determine, after determining the third water heater is unavailable, that the second water heater comes after the third water heater in the hierarchical order.

18. The wireless water heating system of claim 17, wherein the at least one computer processor is further configured to access memory and execute the computer-executable instructions to:

send third instructions to the first water heater to cause the first water heater to wirelessly send second operational instructions to the second water heater, the second operational instructions based on the demand information.

19. The wireless water heating system of claim 17, wherein the third water heater is non-responsive or malfunctioning.

20. The wireless water heating system of claim 11, wherein the first use value, the second use value, and the third use value are indicative of one or more of run time information or burn information for each of the first water heater, second water heater, and third water heater.

* * * * *